C. A. HUGHES & G. W. MILLER.
EGG TESTER AND CRATER.
APPLICATION FILED OCT. 19, 1914. RENEWED JUNE 23, 1916.
1,193,898.
Patented Aug. 8, 1916.
2 SHEETS—SHEET 1.
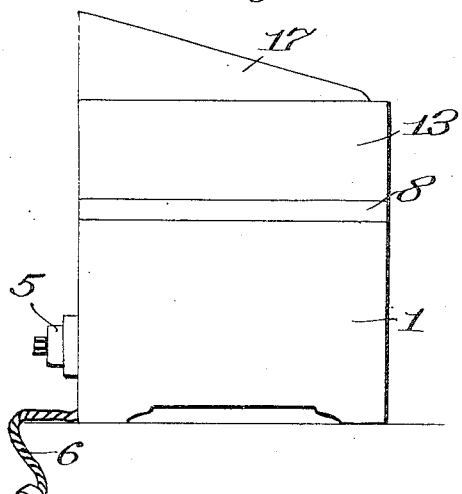
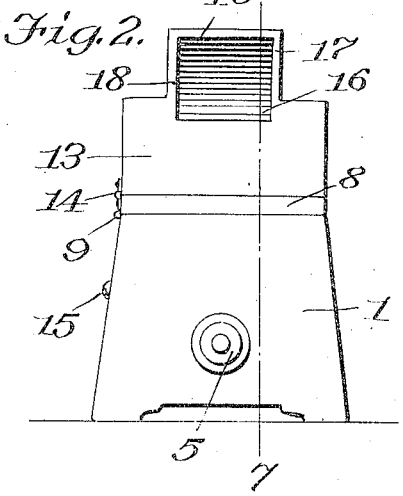
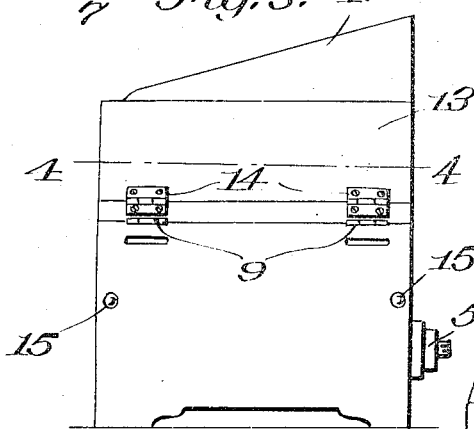
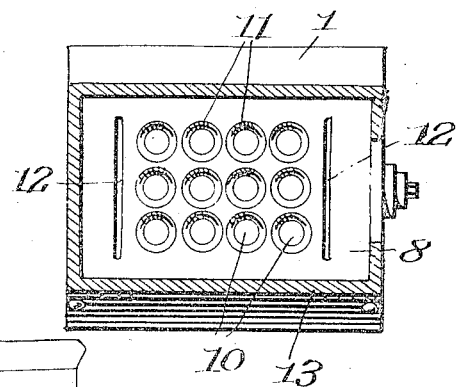
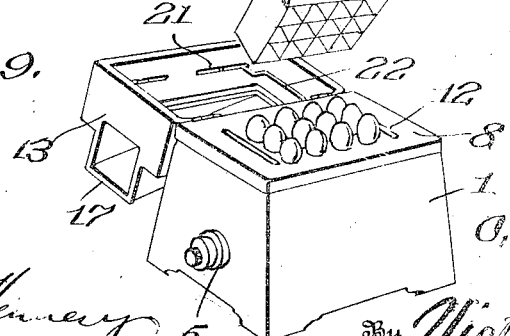
Inventors
C. A. Hughes and
G. W. Miller,
By Victor J. Evans
Attorney
Witnesses C. A. HUGHES & G. W. MILLER.
EGG TESTER AND CRATER.
APPLICATION FILED OCT. 19, 1914. RENEWED JUNE 23, 1916.

1,193,898.

Patented Aug. 8, 1916.
2 SHEETS—SHEET 2.

Inventors
C. A. Hughes and
G. W. Miller,
By Victor J. Evans
Attorney

Witnesses

UNITED STATES PATENT OFFICE.

CHAUNCEY A. HUGHES AND GEORGE W. MILLER, OF ROSSVILLE, ILLINOIS.

EGG TESTER AND CRATER.

1,193,898.

Specification of Letters Patent.

Patented Aug. 8, 1916.

Application filed October 19, 1914, Serial No. 867,473. Renewed June 23, 1916. Serial No. 105,519.

*To all whom it may concern:*

Be it known that we, CHAUNCEY A. HUGHES and GEORGE W. MILLER, citizens of the United States, residing at Rossville, in the county of Vermilion and State of Illinois, have invented new and useful Improvements in Egg Testers and Craters, of which the following is a specification.

This invention relates to a combined egg tester and crater, the object of the invention being to provide a device for the use of merchants and others whereby a predetermined number of eggs may be tested and crated within a minimum period of time.

A further object of the invention is to provide a device which may be used for testing and crating a large number of eggs in predetermined quantities in a rapid and efficient manner, and which may be employed without the use of a dark room or other special equipment.

A further object of the invention is to provide a device whereby eggs which have been crated may be tested, or eggs which are being tested may be crated immediately thereafter in a simple and quick manner.

A still further object of the invention is to provide a simple, reliable, convenient and efficient egg testing device which may be manufactured and sold at a comparatively low price.

The invention consists of the features of construction, combination and arrangement of parts herein fully described and claimed, reference being had to the accompanying drawings in which:—

Figure 5:
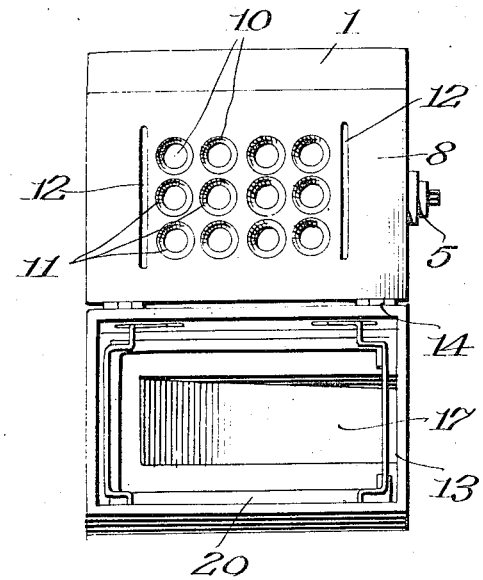
Figure 6:
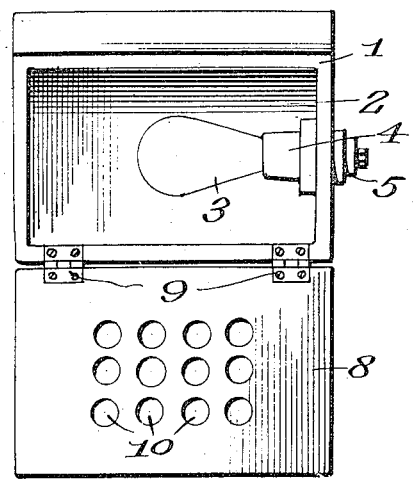
Figure 7:
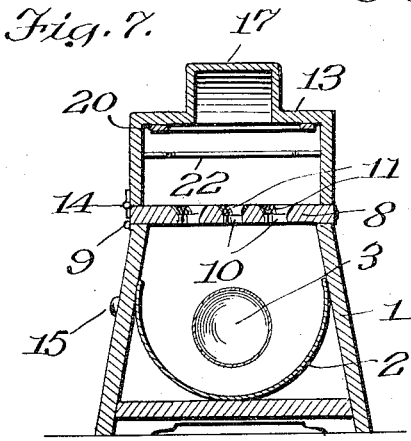
Figure 8:
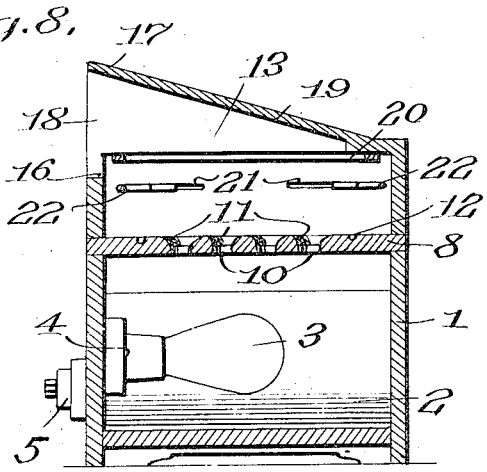

Figure 1 is a front elevation of a combined egg tester and crater constructed in accordance with the present invention. Fig. 2 is an end elevation of the same. Fig. 3 is a rear elevation of the device. Fig. 4 is a sectional plan view on the line 4—4 of Fig. 3. Fig. 5 is a top plan view showing the hood turned back and exposing the lid in normal position. Fig. 6 is a view similar to Fig. 5, but showing both the hood and lid or tray turned back so as to expose the interior of the light chamber. Fig. 7 is a front to rear section through the device. Fig. 8 is a vertical longitudinal section through the device on line 7—7 of Fig. 2. Fig. 9 is a perspective view showing a set of tested eggs held in position for removal.

In carrying our invention into practice, we provide a light box or chamber 1, preferably of oblong rectangular form in plan and frusto-pyramidal form in cross section. This box or light chamber may be made of wood or other suitable material and has arranged therein a reflector 2 and a suitable source of light 3, which may be one or more incandescent lamps of proper illuminating power. In the present instance, a portable type of tester and crater is shown, in which the lamp bulb is fitted within a socket 4 electrically connected with a switch 5 arranged externally on one of the end walls of the box, the terminals of the socket being connected with a lamp cord or conductor 6 terminating in a suitable plug or connector 7, by which current may be supplied in an obvious manner from any ordinary electric lighting system.

A lid or tray 8 is hinged to the rear wall of the light box, as shown at 9, and is adapted to be disposed for testing purposes over the open top of said light box, as shown for instance in Fig. 5. This lid or tray is provided with any suitable number of light apertures 10 which are bevel-walled and provided with soft linings 11, of velvet, felt or other suitable material, so as to provide seats or receiving recesses for the eggs to be tested. In the present instance, twelve such light apertures and seat recesses are shown, so that a dozen eggs may be tested at a time.

It will, of course, be understood that in the testing operation the light from the source 3 is reflected through the apertures 10 and through the eggs disposed within the seat recesses, whereby any imperfections in the eggs will be exposed and may be determined, as hereinafter fully described. The top of the lid or tray is provided with transverse grooves 12 to receive the cross piece of a sliding bail shaped cover holder of the type employed upon a certain style of standard egg tray, when such holder is inverted with the said cross piece disposed adjacent to either end of the light box. For coöperation with the light box and lid or tray, we provide a hood or dark chamber 13, which is in the form of a box like cover hinged to the lid or tray, as shown at 14, the construction being such that the hood may be swung backward to an open position independent of the lid or tray, as shown in Fig. 5, or the lid or tray also thrown backward over upon the open inverted hood or dark chamber, as shown in Fig. 6. The tray and hood are so constructed and connected that their weights approximately balance each other, whereby the use of auxiliary means to support the hood in open position is obviated, and the tendency of the weight of the open hood to lift the lid 8 avoided, and suitable knobs or projections 15 are preferably provided upon the rear wall of the light box against which the hood may abut when in open position.

The hood 13 is provided in its top and one end with a cut away portion or opening 16, over which is arranged a cover 17, which is open in line with the cut away end of the hood and forms therewith a sight aperture 18. The top wall 19 of this cover 17 inclines downwardly toward the opposite end of the hood, and it and the interior surfaces of the hood and upper surface of the tray are preferably dark colored so as to render the light rays passing through the light apertures and eggs clearly visible, so that all of the eggs may be clearly observed from the sight aperture. If desired, the under side of the top wall of the hood may be provided with retaining strips or curbing 20 around the light opening therein, forming a space of proper size to receive a standard crate adapted to contain eggs to the number which may be tested at one time by the device namely one dozen in the present instance, and to thus dispose the crate so that the egg receiving cells therein will aline with the light apertures and seat recesses 10 when the hood is turned over upon the lid or the lid over upon the hood. The sides of the hood are also provided with guide grooves 21 to slidably receive the ends of adjustable bail-shaped holders, grippers or clamps 22 by means of which a standard type of egg carrier may be held and clamping within the hood.

The operation of the device is as follows: The eggs to be tested are placed in position in the light recesses 10 of the closed lid or tray, after which the hood is turned to closed position, the light turned on and the eggs observed through the sight aperture 18 at one end of the hood. The light rays from the lamps in the lamp box will thus be reflected and projected through the eggs and into the dark chamber formed by the hood, rendering clearly visible the interior of the eggs. As is well known, the decayed portion of an infertile egg rises to the top and shows in the form of a dark spot, the fertile fresh eggs being substantially transparent, so that the condition of the eggs may be accurately and quickly determined, the bad eggs rejected and a corresponding number of good eggs substituted in their place and tested. The efficiency of the device in this testing action is increased by the provision of the cover 17, inasmuch as it has been found that the eggs may be tested with better and more certain results by looking at them from above at a downward angle, whereby any dark spots showing decay therein are more readily observable, the provision of the cover with the inclined top giving the angular line of vision referred to.

After the eggs are tested and a set of strictly pure or fresh eggs obtained, as shown by test, the hood is turned back to an open position, whereupon any standard egg carrier crate of the required egg capacity may be placed upside down or in inverted position over the eggs on the lid or tray so that the cells therein receive the eggs, whereupon by swinging the lid with the eggs and carrier thereon back into the hood, the carrier and eggs will be received in the latter with the carrier in upright position, so that by returning the tray to normal position the carrier and eggs will be exposed, allowing the carrier to be closed or covered to retain the eggs for sale or shipment. In this manner a dozen, or any predetermined number of eggs may be quickly and conveniently tested and crated, allowing a merchant to dispense strictly fresh eggs to a customer in a rapid and convenient manner, or eggs to be tested and crated by a merchant or dealer for storage or shipment within a minimum period of time and comparatively small amount of labor. The device also dispenses with the use of a stationary dark room or other special appliances, and if desired may be used in the form of a portable device which may be arranged in any convenient place for use and furnished with electric current from any suitable source of current supply.

If desired, instead of crating the eggs in the manner above described, the eggs may first be placed in the carrier crate, taken to the tester, and the carrier placed in the hood and secured by the holders 22, which are adjustable for different sized carriers, the tray turned so that it will act as a cover for the hood, and the hood and tray then swung downward over the lamp box. By this operation the eggs are transferred from the carrier crate to the receiving recesses and light apertures, in proper position for inspection or test. The eggs can then be inspected and crated in the carrier as described in the first operation.

It will thus be seen that our invention provides an egg tester and crater whereby a predetermined number of eggs may be tested and crated within a minimum period of time, without the use of expensive appliances, the construction of the device being such that it may be manufactured and sold at a comparatively low cost. It will be seen that the device, in addition to acting as a tester, also serves as a means by which the eggs may be transferred from the tester to a carrier and crated for immediate delivery, or transferred from a crate to the tester and back again to the crate in a simple, quick and efficient manner. The device will therefore be found especially convenient to merchants and dealers desirous of vending strictly fresh eggs in a rapid and convenient manner, where special dark room facilities can not be afforded or the need of a portable or compact construction of testing and crating device is felt.

We claim:—

An egg testing device comprising a light box of frusto-pyramidal form, said box having its walls converging toward its top, illuminating means arranged within said box, a hinged lid for closing the top of the box, said lid having combined light apertures and egg receiving recesses therein and provided with transverse grooves adjacent to the ends thereof, a hood comprising a box-like cover hinged to the lid at the rear portions thereof, said lid and hood being of relative weights to substantially counterbalance each other, and said hood being provided in its sides with guide grooves and having in its top a light aperture, a cover arranged over said aperture and having an open end forming an observation aperture at one end of the hood, the upper wall of said cover inclining at a downward and inward angle from said aperture toward the opposite end of the hood, bail-shaped grippers slidably mounted in said guide grooves, and a retaining curbing at the top of the cover about said light aperture.

In testimony whereof we affix our signatures in presence of two witnesses.

CHAUNCEY A. HUGHES.
GEORGE W. MILLER.

Witnesses:
WM. H. FOSTER,
CHAS. S. WILSON.